ORGANIC COMPOUNDS OF THE TRANSITION METALS

Georgis Codet, Rueil, Francois Dawans, Bougival, Francois-Xavier de Charentenay, Rueil, and Philippe Teyssie, Le Vesinet, France, assignors to Institut Francais du Petrole des Carburants et Lubrificants, Rueil-Malmaison, France
No Drawing. Filed Oct. 1, 1969, Ser. No. 862,948
Claims priority, application France, Oct. 1, 1968, 168,366
Int. Cl. C07f 15/04, 15/06
U.S. Cl. 260—439 R    6 Claims

ABSTRACT OF THE DISCLOSURE

As catalysts, particularly for the polymerization of ethylenically unsaturated monomers, there are provided compounds of the formula:

$$[((H_{3-n}X_n)C\text{—}CO_2\text{—})_m M_T(Y)_p]_q L_r$$

in which X is a halogen atom, $n$ is 1, 2 or 3, $M_T$ is a transition metal from Groups IV to VIII (sub-groups $a$ and $b$) of the periodic chart of the elements, Y is a hydride ion or an anion, except OH, each of $m$, $p$ and $q$ is an integer from 1 to 4, $m+p$ being such as to constitute an electrically neutral compound, L is a Lewis base and $r$ is a number from 0 to 2. Preferred examples include nickel monochloro-trifluoracetate, nickel monobromo-trifluoracetate, cobalt monochloro-trifluoracetate, and complexes thereof.

---

This invention relates to new organic compounds of the transition metals, their manufacture and uses, particularly as catalysts for converting unsaturated hydrocarbons, and more particularly as catalysts for the stereospecific polymerization of monomeric compounds having ethylenic bonds.

These compounds conform to the general formula:

$$[((H_{3-n}X_n)C\text{—}CO_2\text{—})_m M_T(Y)_p]_q L_r$$

wherein X is a halogen atom, $n$ is 1, 2 or 3, $M_T$ is a transition metal of Groups IV to VIII (sub-groups $a$ and $b$) of the periodic chart of the elements.

Y is a hydride ion or an anion, except OH. For example, Y may represent H, F, Cl, Br, I, $ClO_3$, $ClO_4$, $BrO_3$, $IO_3$, CN, SCN, $SO_4$, $S_2O_3$, $S_4O_6$, $NO_3$, $NO_2$ or OR, where R is a hydrocarbon monovalent radical preferably containing 1–30 carbon atoms, for example alkyl, cycloalkyl, aralkyl or aryl. Y may represent the anion $$(H_{3-n}X_n)C\text{—}CO_2$$

Each of $m$, $p$ and $q$ is an integer, preferably 1 to 4, $m+p$ being such as to constitute an electrically neutral compound ($m+p$ is usually equal to the valence of $M_T$).

L is a Lewis base such as, for example, an ether, an amine, a phosphine.

$r$ Has preferably values from 0 to 2.

These componds have the following advantages:

They may be easily obtained by reactions which do not involve the use of any unstable organometallic compound They have a good stability with respect to time, even when hot, under an inert atmosphere, which makes their storage and handling easier They are inexpensive and involve the use of easily available elements.

The compounds of this invention may be used as catalysts in organic synthesis, in such reactions as dimerization, oligomerization, hydrogenation, oxidation, carbonylation and more particularly stereospecific polymerization of unsaturated hydrocarbons. These reactions being well-known to those skilled in the art, they will not be described in detail.

More particularly, the halides of nickel trifluoracetate of formula $CF_3\text{—}CO_2\text{—}Ni\text{—}Y_1$ where $Y_1$ is a halogen atom, preferably chlorine, are catalysts for manufacturing 1,4-cis-elastomeric polybutadiene. The compounds of the general formula above wherein $Y_1$ is the anion $(H_{3-n}X_n)C\text{—}CO_2\text{—}$ may also be used as previously indicated.

These catalysts may be made more active by means of one of the following treatments:

Heating above 50° C., preferably 100 to 250° C., for at least one minute (for example 1 minute to 24 hours)

Irradiation of the reaction mixture by means of ultraviolet rays for at least one minute (for example 1 minute to 24 hours), at any temperature.

These two types of treatment are particularly efficient when applied to polymerization catalysts in which Y is an anion of the formula $(H_{3-n}X_n)C\text{—}CO_2\text{—}$ The conditions under which unsaturated monomers, and particularly butadiene, may be polymerized, are well known and will not be described in detail. Reference is made, for example, to the published Dutch patent applications 66/1.988 and 66/8.304, filed Feb. 16 and June 15, 1966, and corresponding to U.S. Pats. 3,400,115 and 3,497,488 respectively.

At least 0.001 gr. atom of nickel, and preferably from 0.1 to 2 gr. atom thereof in the form of a compound according to this invention, will be used for 100 moles of monomer.

The new metallic compounds of this invention may be obtained by using well-known processes, such as, for example, the reaction of the product resulting from the controlled hydrolysis of a derivative of a transition metal of formula $(Y)_p M_T(OH)_m$ with a haloacetic acid or one of its derivatives, preferably an anhydride thereof, or otherwise, when Y is a halogen anion, by the partial reaction of a halogenation agent with a haloacetate of a transition metal of formula $$[(H_{3-n}X_n)C\text{—}CO_2\text{—}]_k M_T$$

in which $k$ is the valence of the metal $M_T$.

This reaction is advantageously carried out in the solvents of the haloacetate of the transition metal, particularly those inert with respect to the halogenation agents, for example the ethers or di-ethers, for example, ethylene glycol dialkyl ethers. Any halogenation agent may be used, for example $PX_5$, $PX_3$, $POX_3$, halogenide of a carboxylic acid (aromatic cycloaliphatic or aliphatic), $SOX_2$, $X_2$ where X may be F, Cl, Br or I. The most favorable are those which are soluble or miscible with the solvent used in the manufacture, or the products of which, after chlorination are soluble, or miscible with this solvent. Thionyl halides are particularly interesting for manufacturing these compounds.

The halogenation temperature is dependent, in part, on the agent employed. It lies generally in the range —20 to +100° C.

The halogenation agent may be used in a stoichiometrical amount or in a different amount, according to the desired conversion rate of the reactants.

The formed compounds may combine with one or more molecules of solvent and/or the products resulting from the decomposition of the halogenation agent. A treatment under vacuum at a temperature between 20 and 250° C. is convenient for eliminating these combined molecules.

The compounds in which Y is an anion other than a halogen or an OR radical may be obtained from the compounds in which Y is a halogen atom by reaction with a convenient salt or alkoxide of a metal, preferably an alkali metal, an alkaline-earth metal or silver.

The following non-limitative examples are given for illustration purposes:

EXAMPLE 1

14.25 g. (50 millimoles) of anhydrous nickel trifluoracetate disolved in one liter of anhydrous di-ethyl ether are reacted with 6.25 g. (52.5 millimoles) of thionyl chloride at room temperature. After 6 hours of reaction, 13.14 g. of yellow crystals of the formula $$CF_3COONiClO(C_2H_5)_2$$

may be isolated by filtration. Conversion rate: 92%.

104 g. of 1,3-butadiene and 40 ccm. of normal heptane are added to 28 g. of the previous compound; after stirring for 22 hours at 50° C., 57 g. of polybutadiene are obtained, the microstructure of which, as determined by infra-red spectrophotometry according to the method of D. Morero, A. Santambrogio, L. Porri and F. Ciampelli (La Chimica e l'Industria XLI—8—1959) consists of 86% of cis-1,4 units, 9% of trans-1,4 units and 5% of 1,2 units.

EXAMPLE 2

104 g. of 1,3-butadiene and 40 ccm. of normal heptane are added to 2,4 g. of nickel chloride trifluoracetate $CF_3COONiCl$, manufactured by heating the corresponding etherate for 30 minutes at 150° C. under vacuum; after 4 hours of reaction at 50° C., there is obtained 56 g. of polybutadiene containing 94% of cis-1,4-units, 3% of trans-1,4 units and 3% of 1,2-units; the intrinsic viscosity of the polymer, as determined on a solution of the polymer in toluene at 30° C., is 1.46 dl./h.

EXAMPLE 3

0.57 g. of nickel trifluoracetate of formula $$(CF_3COO)_2Ni$$

are heated at 150° C., under vacuum, in a reaction vessel. After cooling to −60° C., there is added 5.2 g. of butadiene and 10 ccm. of normal heptane, and the resulting mixture is stirred for 46 hours at 50° C. There are obtained 1.5 g. of polybutadiene having an intrinsic viscosity of 1.9, as determined in toluene at 30° C. The microstructure of the resulting polybutadiene, as determined according to the method of D. Morero, A. Santambrogio, L. Porri and F. Ciampelli (La Chimica e l'Industria XLI—8—1959), consists of 95% of cis-1,4 units, 1% trans-1,4 units and 4% 1,2 units.

EXAMPLE 3A

When, in Example 3, nickel trifluoracetate is replaced with an equivalent amount of nickel acetate, everything else remaining unchanged, no polymer can be obtained.

EXAMPLE 4

2 g. of nickel chloride trifluoracetate $CF_3COONiCl$, manufactured according to Example 2, are added to a solution of 52 g. of butadiene in 80 ccm. of normal heptane; after stirring at 30° C. for 8 hours, 40 g. of polybutadiene are obtained, the microstructure of which consists of 98% of cis-1,4 units, 0.5% of trans-1,4 units and 1.5% of 1,2 units. The intrinsic viscosity of the polymer is 2 dl./g.

EXAMPLE 5

0.29 g. of cobalt trifluoracetate of formula $$(CF_3COO)_2Co$$

are heated at 240° C. for 60 minutes, in an argon stream, and 6.8 g. of isoprene dissolved in 10 ccm. of benzene are added thereto. The mixture is stirred at 30° C. for 15 hours. There are obtained 4 g. of polyisoprene the intrinsic viscosity of which is 2.4 and which contains a high proportion of cis-1,4 units.

EXAMPLE 6

There are used 0.7 g. of nickel chloride trifluoracetate, 52 g. of butadiene and 100 ccm. of toluene. The resulting reaction mixture is subjected at room temperature, for one hour, to the light emitted by a Phillips HPR 125 lamp, and then stirred at 30° C. for one hour. 36 g. of polybutadiene are obtained, containing more than 98% of cis-1,4 units and having an intrinsic viscosity of 2.4 dl./g.

EXAMPLE 7

5.62 g. of the mono-etherate of nickel chloride trifluoracetate $CF_3COONiCl, O(C_2H_5)_2$, manufactured according to Example 1, are dissolved in 400 ccm. of chlorobenzene and the resulting solution is heated under reflux at atmospheric pressure for 30 minutes. 20 ccm. of the solution are introduced in a quartz vessel and 52 g. of butadiene dissolved in 40 ccm. of chlorobenzene are added thereto. The resulting mixture is irradiated by means of a high pressure mercury vapor burner, of the TQ 81 Hannovia type for 40 minutes. 21 g. of polybutadiene are obtained, containing more than 95% of cis-1,4 units, and the intrinsic viscosity of which is 1.74 dl./g.

EXAMPLE 8

There are used 0.57 g. of nickel chloride trifluoracetate, 52 g. of butadiene and 40 ccm. of ortho-dichlorobenzene. The reaction mixture is irradiated for 20 minutes under the same conditions as in Example 7. There are obtained 31 g. of essentially cis-1,4-polybutadiene, the intrinsic viscosity of which is 1.8 dl./g.

EXAMPLE 9

When, in the preceding example, ortho-dichlorobenzene is replaced with a corresponding amount of methylene chloride, without any other change, the conversion to polymer is practically 100%; however, about 10% of the polymer appears as a gel which is insoluble in hydrocarbons.

EXAMPLE 10

Example 9 is repeated, except that the reaction solvent is nitro-ethane, 40 g. of polybutadiene are obtained, containing 97% of cis-1,4 units, 2% of trans 1,4 units and 1% of 1,2-units.

EXAMPLE 11

28.5 g. (100 millimoles) of anhydrous nickel-trifluoracetate $(CF_3—COO—)_2Ni$ dissolved in 1 liter of anhydrous diethyl ether are treated at room temperature with 19.8 g. (95 millimoles) of thionyl bromide. After 14 hours of reaction, the mixture is filtered and yellow crystals may be recovered and dried under vacuum at 100° C. There is thus obtained 23.2 g. (conversion=92%) of a compound whose elemental analysis is in agreement with the formula $CF_3COONiBr$.

When 52 g. of butadiene and 40 ccm. of toluene are added to 0.32 g. of nickel bromide trifluoracetate, there are obtained, after stirring at 50° C. for 30 minutes, 46 g. of polybutadiene containing more than 98% of cis-1,4 units, the intrinsic viscosity of which is 1.64 dl./g.

EXAMPLE 12

28.5 g. (100 millimoles) of anhydrous cobalt trifluoracetate dissolved in 500 ccm. of anhydrous diethyl ether are treated with 11.9 g. (100 millimoles) of thionyl chloride. After 6 hours of reaction, the mixture is filtered and there are obtained violet crystals which are dried under vacuum at room temperature and conform to the formula $CF_3COOCoCl, O(C_2H_5)_2$. By heating the violet crystals at 100° C. under vacuum, there are obtained 19.9 g. (conversion rate of 96%) of blue crystals, the analysis of which conforms to formula $CF_3COOCoCl$.

52 g. of butadiene and 40 ccm. of normal heptane are added to 1 g. of cobalt chloride trifluoracetate. The resulting mixture is irradiated for 2 hours at 25° C. by means of a Phillips HPR lamp; the conversion to essentially cis-1,4 polybutadiene is about 100%.

EXAMPLE 13

When, in Example 12, butadiene is replaced with a corresponding amount of isoprene and normal heptane with toluene, there are obtained 21 g. of polyisoprene containing 54% of cis-1,4 units, 15% of trans-1,4 units and 31% of 3,4-vinyl units. The intrinsic viscosity of the polymer dissolved in toluene at 30° C. is 0.47 dl./g.

EXAMPLE 14

4.8 g. (100 milliatoms) of powdered titanium are reacted with an excess of trifluoracetic acid. The formed compound is dried under vacuum at 140° C. and dissolved in 400 ccm. of anhydrous ethyl ether. After decantation, so as to separate the unreacted titanium, the solution is treated with 11.9 g. (100 millimoles) of thionyl chloride. After 6 hours of reaction at room temperature, there may be obtained by filtration, white crystals which are thereafter dried under vacuum at 150° C.; 13.1 g. (conversion rate of 67%) of a compound conforming to the formula $$CF_3COOTiCl$$

may be obtained.

1.7 g. of titanium chloride trifluoracetate are reacted with 34 g. of isoprene dissolved in 40 ccm. of toluene. After stirring at 50° C. for 6 hours, there are obtained 6 g. of polyisoprene, the microstructure of which consists of 72% of trans-1,4 units and 28% of cis-1,4 units.

The periodic chart of the elements mentioned in this disclosure is commonly known as Mendeleeff's Periodic Arrangement of the Elements.

What we claim as our invention is:

1. An organic compound conforming to the formula:

$$[((H_{3-n}X_n)C{-}CO_2{-})_m M_T(Y)_p]_q L_r$$

in which X is a halogen atom, $n$ is 1, 2 or 3, $M_T$ is nickel or cobalt, Y is a halogen atom, $q$ is an integer from 1 to 4 inclusive, each of $m$ and $p$ is 1 or 2 with $m+p$ being 2 or 3 and balancing the valence of $M_T$, L is a Lewis base and $r$ is a number from 0 to 2 inclusive.

2. The compounds of claim 1, having the formula $$CF_3{-}CO_2{-}M_T{-}Y$$

3. The compounds of claim 2, wherein $M_T$ is nickel.

4. A compound according to claim 1, selected from the group consisting of nickel monochlorotrifluoracetate and its complex with diethyl ether.

5. A compound according to claim 1, selected from the group consisting of nickel monobromotrifluoracetate and its complex with diethyl ether.

6. A compound according to claim 1, selected from the group consisting of cobalt monochlorotrifluoracetate and its complex with diethyl ether.

References Cited

UNITED STATES PATENTS 2,882,289  4/1959  Appell _____ 260—448

FOREIGN PATENTS 642,923  5/1964  Belgium.

OTHER REFERENCES

Chemical Abstracts, vol. 60, 2787c (1964).
Chem. Absts. vol. 63, 1453b (1965).
Chem. Absts. vol. 65, 20012b (1966).
Chem. Absts. vol. 66, 7956z (1967).
Chem. Absts. vol. 67, 32301y (1967).
Chem. Absts. vol. 67, 60467a (1967).
Chem. Absts. vol. 67, 6166p (1967).
Chem. Absts. vol. 68, 43663q (1968).
Chem. Absts. vol. 68, 21629f (1968).
Chem. Absts. vol. 68, 40722x (1968).

HELEN M. S. SNEED, Primary Examiner

U.S. Cl. X.R.

204—159.11; 260—94.3, 429.5